United States Patent [19]

Carlin et al.

[11] 4,110,229
[45] Aug. 29, 1978

[54] SALINITY TOLERANT SURFACTANT OIL RECOVERY PROCESS

[75] Inventors: Joseph T. Carlin; Timothy N. Tyler, both of Houston, Tex.; Melvin E. Mills, Jr., Salem, Ill.; James W. Ware, Tulsa, Okla.

[73] Assignee: Texaco Inc., New York, N.Y.

[21] Appl. No.: 746,646

[22] Filed: Dec. 1, 1976

[51] Int. Cl.$^2$ ............................................. E21B 43/22
[52] U.S. Cl. ............................... 252/8.55 D; 166/273; 166/275
[58] Field of Search .................. 252/8.55 D; 166/273, 166/274, 275

[56] References Cited

U.S. PATENT DOCUMENTS

| | | | |
|---|---|---|---|
| 3,468,377 | 9/1969 | Dunlap et al. | 166/274 |
| 3,508,612 | 4/1970 | Reisberg et al. | 166/274 |
| 3,811,505 | 5/1974 | Flournoy et al. | 166/274 |
| 3,811,507 | 5/1974 | Flournoy et al. | 166/274 |
| 3,858,656 | 1/1975 | Flournoy et al. | 166/274 |
| 3,890,239 | 6/1975 | Dycus et al. | 252/8.55 |
| 3,945,437 | 3/1976 | Chiu et al. | 252/8.55 |

OTHER PUBLICATIONS

Kirk–Othmer, Encyclopedia of Chemical Technology, Second Edition, vol. 19, 1969, pp. 507–509.

*Primary Examiner*—Herbert B. Guynn
*Attorney, Agent, or Firm*—Carl G. Ries; Thomas H. Whaley; Jack H. Park

[57] ABSTRACT

Disclosed is an aqueous, saline surfactant-containing fluid and an oil recovery process using the fluid for recovering oil from formations containing high salinity and/or high hardness water, the fluid comprising an anionic surfactant such as organic sulfonate especially petroleum sulfonates as well as synthetic alkyl or alkylaryl sulfonates and a solubilizing co-surfactants such as an ethoxylated alcohol, alkyl phenol, or alkyl or alkylaryl thiol, or sulfated or sulfonated, ethoxylated alcohols or alkyl phenols. Optimum performance in any particular field is achieved if the ratio of primary anionic surfactant to solubilizing co-surfactant is carefully chosen so the surfactant combination exhibits borderline solubility in the particular formation brine in which the surfactants are to be employed. The concentration ratio of primary and solubilizing surfactants which results in the desired borderline solubility may be identified by preparing a number of samples in the formation water using different weight ratios of primary surfactant to solubilizng co-surfactant concentration, and visually noting the minimum co-surfactant needed to avoid separation of the surfactant fluid into separate phases, or which gives the surfactant fluid a pearlescent, a swirl-silver appearance which is characteristic of fluids having the proper balance of primary anionic surfactant and solubilizing co-surfactant.

5 Claims, No Drawings

SALINITY TOLERANT SURFACTANT OIL RECOVERY PROCESS

BACKGROUND OF THE INVENTION

1. Field of the Invention

This invention concerns an enhanced oil recovery process and more specifically, a surfactant flooding enhanced recovery process. Still more specifically, this invention is concerned with an oil recovery process usable in subterranean oil formations containing water having abnormally high salinities and/or concentrations of divalent ions such as calcium and magnesium by the use of an aqueous fluid containing a primary anionic surfactant and a solubilizing co-surfactant in a critical, determinable ratio.

2. Description of the Prior Art

Petroleum is normally recovered from subterranean formations in which it has accumulated by penetrating the formation with one or more wells and pumping or permitting the petroleum to flow to the surface through these wells. Recovery of petroleum from formations is possible only if certain conditions exist in the formation. The petroleum must be present in the formation in an adequate concentration, and there must be sufficient permeability or interconnected flow channels within the formation to permit the flow of fluids therethrough if sufficient pressure is applied to the fluids. When the formation has natural energy present in the form of an underlying active water drive, or gas dissolved in the petroleum which can exert pressure to drive the petroleum to the producing well, or a high pressure gas cap above the petroleum saturated portion of the formation, this natural energy may be utilized to recover petroleum. Recovery of petroleum by use of natural energy as described above is referred to as primary recovery. When this natural energy source is depleted, or in those instances where the formation does not contain sufficient natural energy to support primary recovery, some form of supplemental or enhanced recovery process must be applied to the formation in order to extract petroleum therefrom. Supplemental recovery is sometimes referred to in the art as secondary or tertiary recovery, although in fact it may be primary, secondary or tertiary in sequence of employment.

Water flooding, which involves the injection of water into the subterranean, petroliferous formation for the purpose of displacing petroleum toward the producing well, is the most economical and widely practiced supplemental recovery method. Water does not displace petroleum with high efficiency, however, since water and oil are immiscible, and also because the interfacial tension between water and oil is quite high. Persons skilled in the art of oil recovery have recognized this inherent weakness in water flooding and many additives have been described in the literature for decreasing the interfacial tension between the injected water and the formation petroleum in order to increase the oil displacement efficiency. For example, U.S. Pat. No. 2,233,381 (1941) discloses the use of polyglycol ethers as surface active agents or surfactants to increase the capillary displacement efficiency of an aqueous flooding medium. U.S. Pat. No. 3,302,713 discloses the use of petroleum sulfonates prepared from a specific boiling range fraction of the petroleum feed stock for a surfactant in oil recovery operation. Other surfactants which have been proposed for oil recovery operations include alkylpridinium salts, alkyl sulfates, alkylaryl sulfates, ethoxylated alkyl or alkylaryl sulfates, alkyl sulfonates, alkylaryl sulfonates, and quaternary ammonium salts.

The above described surfactants are satisfactory in some formations, particular wherein the salinity as well as concentration or divalent ions in the formation water is relatively low. Generally, the salinity must be less than about 10,000 parts per million and the concentration of divalent ions must be less than about 500 to 1,000 parts per million in order to permit the use of the most commonly available primary anionic surfactants such as petroleum sulfonate.

Persons skilled in the art have recognized the limitation of simple anionic surfactants such as petroleum sulfonate and have described the use of certain solubilizing co-surfactants therewith. U.S. Pat. Nos. 3,792,731; 3,811,504; 3,811,505; and 3,811,507 describe certain mixtures of alkyl or akylaryl sulfonates and nonionic surfactants which exhibit satisfactory performance in petroleum formations having high salinity and/or hard water. U.S. Pat. No. 3,508,612 (1970) describes the use of a dual surfactant system comprising an organic sulfonate such as a petroleum sulfonate and a sulfated, ethoxylated primary or secondary alcohol, which is compatible with high salinity and/or high divalent ion-containing formation water. U.S. Pat. Nos. 3,827,497 and 3,890,239 relate to oil recovery fluids and processes which are compatible with high salinity formation waters and involve organic sulfonate and sulfonated, ethoxylated alcohol mixtures.

While the aforementioned multi-component systems can be rendered soluble in high salinity and/or high divalent ion concentration formation waters, their use has not always been satisfactory because the ratio of the concentrations of the primary anionic surfactant and the solubilizing co-surfactant are extremely critical and difficult to determine and varies with the salinity, divalent ion concentration, as well as with the specific surfactant composition being employed. If too little solubilizing surfactant is used, the primary anionic surfactant precipitates in the presence of the high salinity water. If too much solubilizing surfactant is used, the material is rendered so soluble in water that its effectiveness for purpose of reducing the interfacial tension between the drive water and the formation petroleum is greatly reduced. In either case, oil recovery falls off sharply. Moreover, the cost of the solubilizing co-surfactant is generally two to five times as great as the cost per pound of the primary anionic surfactant, and the use of excessive amounts of solubilizing co-surfactant renders an oil recovery process economically attractive.

U.S. Pat. No. 3,916,997 (1975) describes the use of an oil-external micellar dispersion wherein the concentration of surfactant and alcohol used as a solubilizer are varied to produce a fluid having an electrical conductivity above a specified value.

In view of the foregoing discussion, it can be appreciated that there is a substantial, unfulfilled commercial need for an efficient and economical petroleum recovery method applicable to formations containing high salinity and/or high divalent ion concentration.

SUMMARY OF THE INVENTION

The present invention concerns a petroleum recovery process usable in formations containing water having high salinities, e.g., in excess of 10,000 parts per million total dissolved solids and/or high concentrations of divalent ions such as calcium and/or magnesium e.g., greater than about 500 to 1,000 parts per million. The surfactant system comprises at least two surfactants;

(1) a primary anionic surfactant, generally an organic sulfonate such as petroleum sulfonate or a synthetic alkyl or alkylaryl sulfonate; and (2) a solubilizing co-surfactant which renders the primary anionic surfactant soluble in the particular high salinity and/or high divalent ion concentration formation water, which may by any one of the following surfactants or mixtures thereof.

(a) a nonionic surfactant such as an ethoxylated aliphatic or an ethoxylated alkylaryl compound;

(b) a nonionic mercaptan-related surfactant such as an ethoxylated alkyl or alkylaryl thiol;

(c) an aliphatic or alkylarylpolyalkoxyalkyl sulfonate compound having the following structure:

$$RO(R'O)_nR''SO_3^-M^+$$

wherein R is an aliphatic group including alkyl linear or branched, having from 8 to 22 carbon atoms, or an alkylaryl group having from 8 to 15 carbon atoms in the alkyl chain, R' is ethylene or a mixture of ethylene and higher alkylene groups with relatively more ethylene than higher alkylene, n is an integer from 2 to 12, R'' is ethyl, propyl or hydroxypropyl, $SO_2^-$ represents the sulfonate radical, and $M^+$ is a monovalent cation such as sodium, lithium, potassium or ammonium; and (d) an aliphatic or alkylarylpolyethoxyl sulfate surfactant having the following general structure:

$$RO(R'O)_nSO_3^-M^+$$

wherein R, R'; n and M have the same meaning as in (c) above, and $-OSO_3-$ is a sulfate radical.

Among other factors, the choice of solubilizing co-surfactant is influenced by formation water salinity and hardness as well as by formation temperature.

The ratio of the concentrations of the anionic primary surfactant and the solubilizing co-surfactant is carefully chosen so the surfactants are only slightly soluble or exhibit borderline solubility in the particular field water in which the surfactants are to be employed, which is preferably the same as the formation water present in the petroleum formation into which the surfactant fluid is to be injected. The concentrations of surfactants which produce the desired condition of borderline solubility are determined by preparing a series of at least four samples containing various concentrations of the two or more surfactants dissolved in actual samples of formation or field water to be employed in the field project, and determining the lowest ratio of solubilizing co-surfactant to primary anionic surfactant which renders the primary anionic surfactant soluble in the test fluid. At least one of the samples should contain an insufficient quantity of solubilizing co-surfactant to render the primary anionic surfactant soluble in the test solution.

One method for identifying the minimum solubilizer sample employs a series of samples left quiescent for 12-24 hours followed by visual observation of the series and noting the sample containing the least amount of solubilizing co-surfactant in which no phase separation occurred. The lowest ratio of solubilizing co-surfactant to primary surfactant in which phase separation does not occur is the preferred mixture. The preferred ratio may also be identified by a characteristic pearlescent or silver-swirl appearance of the surfactant fluid which occurs when the condition of borderline solubility is achieved.

DETAILED DESCRIPTION OF THE PREFERRED EMBODIMENTS

Our oil recovery process involves the use of a carefully balanced multi-component surfactant system which will be comprised of the following types of surfactants:

(1) at least one primary anionic surfactant, preferably an organic sulfonate such as petroleum sulfonate, or a synthetic alkyl or alkylaryl sulfonate; and (2) a solubilizing co-surfactant which may be comprised of one or more of the following types of surfactants:

(a) a nonionic surfactant such as an ethoxylated aliphatic or an ethoxylated alkylaryl compound, (b) a nonionic, mercaptan-related surfactant such as an ethoxylated alkyl or alkylaryl thiol;

(c) an alkyl or alkylarylpolyethoxyalkyl sulfonate having the following structure:

$$RO(R'O)_nR''SO_3^-M^+$$

wherein R is an aliphatic group, linear or branched, including alkyl having from 8 to 22 carbon atoms, or an alkylaryl group having from 8 to 15 carbon atoms in the alkyl chain.

R' is ethylene or a mixture of ethylene and higher alkylene such as propylene with relatively more ethylene than higher alkylene, n is an integer from 2 to 12

R'' is ethyl, propyl or hydroxypropyl, $SO_3^-$ represents the sulfonate radical, and $M^+$ is a monovalent cation such as sodium, potassium or ammonium; and (d) an alkyl or alkylaryl polyethoxy sulfate surfactant having the following general structure:

$$RO(R'O)_nSO_3^-M^+$$

wherein R, R', n and $M^+$ have the same meaning as in (c) above, and $-OSO_3^-$ is a sulfate radical.

Petroleum sulfonate is a particularly desirable primary anionic surfactant for oil recovery purposes because it is readily available, comparatively inexpensive and quite effective under ideal conditions for recovering petroleum from subterranean, petroleum-containing formations. Normally water soluble petroleum sulfonates, unfortunately, insoluble in water having salinities greater than about 10,000 parts per million total dissolved solids, and/or more than about 500 to 1,000 parts per million divalent ions which are generally calcium and/or magnesium. If petroleum sulfonate is added to a brine having greater salinity and/or divalent ion concentration than the above-identified limits, the petroleum sulfonate is insoluble and will precipitate and ultimately settle out of the solution, forming a clearly separate phase from the aqueous saline solution. If such a fluid were injected into a subterranean, permeable oil formation, little or no interfacial tension reduction would be accomplished because the petroleum sulfonate is not soluble in the aqueous saline fluid in which it is injected; moreover, there is a considerable probability that plugging of at least some of the flow channels in the oil formation would occur because the precipitated petroleum sulfonate blocks or plugs the small capillary flow channels. Accordingly, either a different surfactant must be utilized, which is soluble in the formation water in which the fluid is to be injected, or another material must be added to the surfactant fluid which increases the solubility of petroleum sulfonate or other organic sulfonate primary anionic surfactant in the high salinity and high divalent ion-containing formation water. Alcohols are sometime employed for this purpose, although they have only limited effectiveness and, additionally, it is preferable to utilize a material which is itself a surface active agentand so is capable of reducing the interfacial tension between the formation petroleum and the injected drive water.

Any of the above-identified four general classes of solubilizing co-surfactants may be combined with organic sulfonates such as petroleum sulfonate, and when a proper ratio is achieved between the concentration of the organic sulfonate and the solubilizing co-surfactant, the organic sulfonate is rendered soluble in the presence of high salinity and/or high divalent ion-containing formation water and so effectively reduces the interfacial tension between oil and water and thereby recovers substantial amounts of oil from a formation through which the aqueous surfactant solution is passed.

The choice of solubilizing co-surfactant is influenced by the formation water salinity and divalent ion concentration and by the formation temperature. The ethoxylated alcohols and thiols are effective up to salinities of about 100,000 parts per million total dissolved solids and in formations whose temperatures are as high as 150° F. The alkyl or alkylaryl polyethoxyl sulfates are effective in higher salinities, up to 200,000 parts per million, but hydrolyze at temperature above about 150° F and also exhibit phase instability under such conditions. The alkyl or alkylarylpolyethoxylated sulfonates are tolerant of both very high salinities and high temperatures.

We have found that the degree of solubility of the surfactant composition in the field water is extremely critical to the oil recovery efficiency of the process. If the surfactant is much more soluble in water than in oil, the surfactants are distributed throughout the water phase including both formation water and injected drive water, and little effectiveness will be achieved at the interfacial zone between oil and water. Similarly, if the surfactants are substantially more soluble in oil than in water, the surfactants will partition into and be distributed throughout the oil phase, and have little effect on the surface tension existing at the interfacial zone between oil and water. The optimum surfactant effectiveness is achieved if there is a condition of borderline solubility of the surfactant in the drive water and/or formation water, which causes the surfactants to be concentrated at the interfacial zone between oil and water with relatively little surfactant dissolved in either the oil phase or in the water phase.

We have found that when using organic sulfonate such as petroleum sulfonates and a solubilizing co-surfactant such as those enumerated above, the optimum oil recovery efficiency occurs when the concentrations of the two materials are carefully balanced so as to produce a condition of borderline solubility. If too little solubilizing co-surfactant is used in combination with the primary anionic organic sulfonate, the primary surfactant is not rendered soluble in brine and at least a portion thereof will precipitate from the aqueous solution. This can, as discussed above, result in at least reducing the effectiveness of the surfactant fluid for the purpose of recovering oil, and may lead to permanent, irreversible damage to permeability of the formation, which will prevent any further displacement of petroleum from the formation. On the other hand, if more than the amount of solubilizing co-surfactant which achieves the condition which we have described above as borderline solubility is used in combination with the primary anionic organic sulfonate surfactant, the surfactant is rendered too soluble in the aqueous phase and the amount of oil displaced by such a solution being injected into a formation is reduced fairly substantially. Moreover, since the cost of the solubilizing co-surfactants is generally from two to five times the cost of the primary anionic organic sulfonate surfactant, the result of using too much solubilizing co-surfactant is that the fluid cost is increased in addition to the amount of oil recovered by the use of the fluid being decreased, which results in rapidly diminishing economic attractiveness of the process.

The amount of solubilizing co-surfactant necessary to achieve the above-described desired condition of borderline solubility is highly dependent on all of the possible variations in the structural characteristics of the surfactant molecules employed and on the salinity and divalent ion concentration of the aqueous phase. The equivalent weight of the anionic primary organic sulfonate surfactant, for example, affects the amount of solubilizing co-surfactant required to achieve the condition of borderline solubility. In the instance of using alkyl or alkylaryl polyethoxy sulfates or sulfonates as solubilizing co-surfactants, any change in the length of the alkyl chain which comprises the hydrophobe of the surfactant molecule, or a change in the number of ethoxy groups condensed with the molecule, changes the amount of that solubilizing co-surfactant needed to achieve the condition of borderline solubility with whatever primary anionic surfactant is used. Furthermore, the aqueous fluid salinity and the concentration of divalent ions present in the fluid will also vary the amount of the surfactants needed to achieve borderline solubility. Generally, higher salinity and/or higher concentrations of divalent ions of the aqueous fluid in which the surfactants are dissolved require increasing numbers of ethylene oxide units to be present on the solubilizing co-surfactant molecule.

We have found a very satisfactory direct method for determining the proper concentrations of primary anionic surfactant and solubilizing co-surfactant involves actually preparing a series of solutions containing the candidates for use in a particular application in various concentrations, and determining the minimum ratio of solubilizing co-surfactants to anionic primary surfactant which produces the desired condition of borderline solubility in the particular environment of salinity and hardness in which the surfactants are to be employed in a surfactant flood. It is essential that the surfactant fluid salinity and concentration of divalent ions match the salinity and divalent ion concentration of the formation water as closely as possible, so the surfactants can be tailored to operate in an optimum fashion in that particular aqueous environment.

As a starting point, at least 4 and preferably at least 5 different solutions should be prepared. If petroleum sulfonate is to be used, the concentration may be held constant at a value from about 1 to 2 percent and the concentration of solubilizing co-surfactant varied from 0.1 to 3.0 percent depending on the average equivalent weight of the organic sulfonate used, and the nature of the solubilizer and the fluid salinity. Stated another way, the total concentrations should be between 1 and 5 percent and the weight ratio of solubilizing co-surfactant to primary surfactant should be between 0.1 and 4.0 and preferably less than 1.0. At least one of the samples should contain a quantity of solubilizing co-surfactant which is insufficient to render the primary anionic surfactant soluble in the test solution, with the other samples containing progressively larger quantities of solubilizing co-surfactant. If the wrong concentrations are chosen initially, it will often be necessary to prepare and test additional samples. More than four samples may also be prepared initially to ensure properly identification of the minimum concentration of solubilizing co-surfactant which is sufficient for solubilizing the primary anionic organic sulfonate surfactant.

Having prepared the series of surfactants in the formation water as described above, the ratio of solubilizing co-surfactant to primary anionic surfactant which results in the desired condition of borderline solubility is determined as follows. The samples are initially mixed thoroughly and then allowed to remain quiet without shaking or agitation for a period of at least 8 hours and preferably for at least 24 hours. Samples containing at least the minimum amount of solubilizing co-surfactant, and including those with substantial excesses thereof, will remain all in one aqueous phase. Those samples having insufficient solubilizing co-surfactant will separate into two usually clearly distinct phases. In the case of tests using petroleum sulfonate, samples having insufficient solubilizing co-surfactant will ordinarily exhibit a clear phase and a dark colored phase containing the petroleum sulfonate, which may be on the top or the bottom relative to the clear phase. Samples having excess solubilizer will have a uniform appearance, with only one visually discernable phase. In the case of petroleum sulfonate, the appearance will generally be dark, although not as dark as the separate, petroleum sulfonate phase in those samples having insufficient solubilizing co-surfactant present to achieve the desired single phase.

One embodiment of the process of our invention, then, involves preparing a series of samples according to the foregoing discussion, identifying the minimum concentration of solubilizing co-surfactant which eliminates the tendency for two visually detectable phases to occur, and preparing and injecting an aqueous solution of petroleum sulfonate or other organic sulfonate and solubilizing co-surfactant in the same ratio as was identified above into a formation to recover oil.

The following specific example illustrates this selection process.

It is desired to surfactant flood an oil reservoir which is in the final stages of waterflooding. The formation porosity is 38 percent and the permeability is 125 millidarcies. The formation water salinity is 125,000 parts per million total dissolved solids and the hardness is 5,800 parts per million total divalent ions, mainly calcium and magnesium. The crude oil has an API gravity of 43°. The formation temperature is 185° F.

Samples of field water (same salinity and hardness as the formation water) and formation crude are obtained for testing. A petroleum sulfonate having an average equivalent weight of 380 is chosen for use in this field. An ammonium salt of nonylphenoltetraethoxyethyl sulfonate is selected as the solubilizing co-surfactant. A series of eight samples is prepared, each having 1.5 percent petroleum sulfonate and from 0.1 to 1.5 percent of the nonylphenoltetraethoxyethyl sulfonate in the field water. The samples are mixed thoroughly, allowed to set quescent overnight, and the phase appearance is noted. The concentrations and observed appearance is shown in Table I below.

TABLE I

Phase Condition Of Surfactant Solutions

| Sample | % Co-Surfactant[a] | R[b] | Observation of Phases |
|---|---|---|---|
| A | 0.1 | 0.06667 | TWO PHASE |
| B | 0.2 | 0.13333 | TWO PHASE |
| C | 0.4 | 0.26667 | TWO PHASE |
| D | 0.6 | 0.40 | SINGLE PHASE |
| E | 0.8 | 0.5333 | SINGLE PHASE |
| F | 1.0 | 0.66667 | SINGLE PHASE |
| G | 1.2 | 0.80000 | SINGLE PHASE |
| H | 1.5 | 1.0000 | SINGLE PHASE |

[a]Ammonium salt of nonylphenol tetraethoxyethyl sulfonate
[b]Weight ratio of solubilizing co-surfactant to petroleum sulfonate in the sample.

Based on the first series of tests, it can be seen that 0.4 is the first choice for the ratio of solubilizing co-surfactant to petroleum sulfonate for use in this particular crude oil and field brine. This value could be used; however, a more precise optimum value could be identified based on a second series of tests, to more closely examine the values of R between 0.3 and 0.4. Such a second series is illustrated in Table II below. It can be seen that the minimum value of R for this series is

TABLE II

Phase Condition Of Surfactant Solutions

| Sample | % Of Co-Surfactant | R | Observation Phase |
|---|---|---|---|
| I | 0.45 | 0.300 | TWO PHASE |
| J | 0.50 | .3333 | TWO PHASE |
| K | 0.54 | .3600 | TWO PHASE |
| L | 0.56 | .3733 | SINGLE PHASE |
| M | 0.58 | .3867 | SINGLE PHASE |

It has been discovered that at the precise end point, a distinctive appearance of the surfactant solution is obtained which is clearly different from the appearance of samples having either an excess of insufficient solubilizing co-surfactant present with the primary anionic surfactant, particularly with petroleum sulfonate; a solution having the precise amount of solubilizing co-surfactants to achieve the desired condition of borderline solubility will appear distinctly pearlescent or have a silver-swirl appearance. Maximum oil recovery has consistently been achieved using mixtures of petroleum sulfonate and solubilizing co-surfactants which have this easily recognized pearlescent, silver-swirl appearance. The recognition of this end point appearance is helful in laboratory tests, since its appearance signifies that no additional tests will be required. It is also useful in field application, since appearance of the fluid being injected should ideally be pearlescent.

While the foregoing tests established the desired weight ratio R of solubilizing co-surfactant to petroleum sulfonate, it does not identify the desired or optimum total concentration of surfactants. Another series of tests is needed, involving core displacement tests using cores from the same or a similar formation. The cores are flooded with brine and then resaturated with oil, then water flooded to a high water-oil ratio to establish tertiary oil saturation, after which the surfactant fluid is injected. The additional oil recovered by surfactant flooding is determined and expressed as a percent of the oil remaining in the core after completion of water-flooding and before surfactant flooding. This test is repeated for several values of total surfactant concentration between at least 1.0 percent and about three or four percent holding the ratio R constant at the value determined above. The data in Table III illustrates the results obtained.

TABLE III

| Run | Total % Surfactant | % Tertiary Oil |
|---|---|---|
| 1 | 1.0 | 52 |
| 2 | 1.5 | 70 |
| 3 | 2.0 | 82 |
| 4 | 2.5 | 88 |
| 5 | 3.0 | 90 |
| 6 | 3.5 | 91 |
| 7 | 4.0 | 91 |

It can be seen from the data in Table III that tertiary oil recovery efficiency increase significantly as the total surfactant concentration is increased from 1.0 to 1.5 and to 2.0, but levels off beyond about 2.5%. Thus the economic optimum concentration would be about 2.5%.

In the field application of the process of our invention, ordinarily no preflush is required to reduce formation water salinity or hardness since the surfactant mixture will have been tailored to function optimally at the actual salinity and hardness of the formation water. A preflush may be used if it is desired to accomplish other purposes, such as injecting sacrificial materials to reduce surfactant adsorption. The preflush fluid should have the same salinity and hardness as the formation water, however.

The volume of surfactant fluid injected will be from 0.05 to 1.0 pore volumes based on the formation volume to be swept by the surfactant fluid. Other materials may be included in the surfactant fluid, or injected separately before or after the surfactant fluid such as lignosulfonates or other materials to decrease surfactant adsorption, and from 100 to 1000 parts per million hydrophilic, polymeric viscosity-increasing materials such as polyacrylamides or polysaccharides to increase the viscosity of the surfactant fluid to improve displacement efficiency.

The surfactant fluid is usually followed by from 0.05 to 0.5 pore volumes of a mobility buffer slug, comprising from 100 to 1000 parts per million of hydrophilic, viscosity-increasing polymeric material such as polyacrylamide or polysaccharide dissolved in water, followed by field water to displace all of the fluid and the oil displaced thereby through the formation.

Thus, we have disclosed how the optimum weight ratio of solubilizing co-surfactant to a primary anionic surfactant such as an organic sulfonate, including a petroleum sulfonate, may be determined in simple laboratory tests that are relatively quick and inexpensive to perform. By determining the minimum weight ratio of solubilizing co-surfactant to primary anionic surfactant which achieves a single phase, the optimum mixture for oil recovery is determined. The method is also useful in field application of the process of our invention, since the concentration ratio of surfactants in the fluid being injected into the formation may be continually or periodically monitored easily by observing the phase condition or presence of pearlescent appearance in order to ensure that the surfactants are being mixed and injected in the proper ratio.

While some discussion of the mechanism and theory of operation of our invention has been included in the foregoing discussion, it was included only for the purpose of additonal disclosure and it is not necessarily meant to imply that these are the only or even the primary mechanisms responsible for the proper functioning of our invention. Although we have described our invention in terms of a number of illustrative embodiments, our invention is clearly not so limited since many variations thereof will be apparent to persons skilled in the art of surfactant flooding enhanced oil recovery without departing from the true spirit and scope of our invention, and it is our desire and intention that our invention be limited and restricted only by those limitations and restrictions which appear in the claims appended immediately hereinafter below.

We claim:

1. In a method of recovering petroleum from a subterranean, petroleum-containing, permeable formation penetrated by at least two wells in fluid communication with the formation, said formation also containing water of know or determinable salinity and divalent ion concentration, comprising injecting an aqueous, saline, surfactant-containing fluid into the formation by means of at least one of the wells to displace petroleum toward at least one other well from which it is recovered to the surface of the earth, said surfactant fluid having salinity and divalent ion concentration about equal to the formation water and containing an organic sulfonate primary anionic surfactant and at least one solubilizing co-surfactant selected from the group consisting of ethoxylated alkylthiols, ethoxylated alkylarylthiols, alkylpolyethoxyalkyl sulfonates having from 8 to 22 carbon atoms in the first alkyl chain and the second alkyl is ethyl, propyl or hydroxypropyl and from to 2 to 12 ethoxy groups per molecule, alkylarylpolyethoxyalkyl sulfonates having from 8 to 15 carbon atoms in the first alkyl chain and the second alkyl is ethyl, propyl or hydroxypropyl, and from 2 to 12 ethoxy groups per molecule, alkylpolyethoxy sulfates having from 8 to 22 carbon atoms and from 2 to 12 ethoxy groups per molecule, alkylaryl polyethoxy sulfates having from 8 to 15 carbon atoms in the alkyl chain and from 2 to 12 ethoxy groups per molecule, wherein the improvement comprises
    (a) determining the ratio of primary anionic surfactant to solubilizing co-surfactant which results in the surfactant mixture exhibiting borderline solubility in the fluid by a method comprising:
        (1) preparing a series of at least four samples having total surfactant concentration between 1.0 and 4.0 percent by weight and weight ratios of solubilizing co-surfactant to primary anionic surfactant from 0.1 to 4.0;
        (2) mixing the samples and allowing them to stand for at least 12 hours; and
        (3) identifying the minimum ratio of solubilizing co-surfactant to primary anionic surfactant which exhibits a single phase condition; and
    (b) blending the organic sulfonate primary anionic surfactant and a solubilizing co-surfactant in the minimum ratio determined above which achieves borderline solubility of the surfactants in the aqueous surfactant fluid.

2. A method as recited in claim 1 wherein the organic sulfonate is selected from the group consisting of petroleum sulfonate, alkyl sulfonate, alkylaryl sulfonate, and mixtures thereof.

3. A method as recited in claim 1 wherein the anionic surfactant is petroleum sulfonate.

4. A method as recited in claim 1 wherein the solubilizing co-surfactant is an alkyl or alkylarylpolyethoxy sulfate.

5. In a method of recovering petroleum from a subterranean, petroleum-containing, permeable formation penetrated by at least two wells in fluid communication with the formation, said formation also containing water of known or determinable salinity and divalent ion concentration, comprising injecting an aqueous, saline, surfactant-containing fluid into the formation by means of at least one of the wells to displace petroleum toward at least one other well from which it is recovered to the surface of the earth, said surfactant fluid having salinity and divalent ion concentration about equal to the formation water and containing an organic sulfonate primary anionic surfactant and at least one solubilizing co-surfactant selected from the group consisting of ethoxylated alkylthiols, ethoxylated alkylarylthiols, alkylpolyethoxyalkyl sulfonates having from 8 to 22 carbon atoms in the first alkyl chain and the second alkyl is ethyl, propyl or hydroxypropyl, and from to 2 to 12 ethoxy groups per molecule, alkylarylpolyethoxyalkyl sulfonates having from 8 to 15 carbon atoms in the first alkyl chain and the second alkyl is ethyl, propyl or hydroxypropyl, and from 2 to 12 ethoxy groups per molecule, alkylpolyethoxy sulfates having from 8 to 22 carbon atoms in the alkyl chain and from 2 to 12 ethoxy groups per molecule, alkylarylpolyethoxy sulfates having from 8 to 15 carbon atoms in the alkyl chain and from 2 to 12 ethoxy groups per molecule, wherein the improvement comprises
  (a) determining the ratio of organic sulfonate primary anionic surfactant to solubilizing co-surfactant which results in the surfactant mixture exhibiting borderline solubility in the fluid by a method comprising:
    (1) preparing a series of at least four samples having total surfactant concentration between 1.0 and 4.0 percent by weight and weight ratios of solubilizing co-surfactant to primary anionic surfactant from 0.1 to 4.0;
    (2) mixing the samples and allowing them to stand for at least 12 hours; and
    (3) identifying the ratio of solubilizing co-surfactant to primary anionic surfactant which produces a fluid having a silver swirl appearance;
  (b) blending the organic sulfonate primary anionic surfactant and a solubilizing co-surfactant in the ratio determined above which achieves borderline solubility of the surfactants in the aqueous surfactant fluid.

* * * * *